Patented Nov. 18, 1952

2,618,628

UNITED STATES PATENT OFFICE 2,618,628

POLYMERS OF NUCLEAR CHLORINATED ALPHA-METHYL STYRENE

John J. Hayes, Niagara Falls, N. Y., assignor to Mathieson Chemical Corporation, a corporation of Virginia No Drawing. Application September 25, 1946, Serial No. 699,342

1 Claim. (Cl. 260—91.5)

The present invention relates to a new and useful class of compositions of matter having particular utility as thermoplastic molding materials.

My new compositions of matter may be characterized in conventional language as high homopolymers of alpha-methyl-polychlorostyrenes. They are relatively high-melting plastic solids, normally produced as a powder which is readily molded into composite forms generally less brittle and in other respects frequently more desirable than thermoplastics prepared from alpha-alkyl-styrenes containing less than two nuclear chlorine atoms per molecule or from polychlorostyrenes not substituted in the vinyl group.

My new class of plastic solids may be prepared by the polymerization of alpha-methyl-styrenes containing 2 or more nuclear chlorine atoms and is illustrated by the following specific examples of these compounds and advantageous methods of preparing them.

Example I

Homopolymers of alpha-methyl-dichloro-styrene were prepared as follows:

Cumene (isopropyl benzene) was chlorinated in the absence of light and in the presence of an iron catalyst at 35° C. to obtain nuclear dichlorocumenes. The resultant dichlorocumenes had a refractive index, $N_D^{25}=1.5315$ and a density at 25° C. of 1.161 g. per cc. Its chlorine content was 37.9% and it boiled at 224° C. at 760 mm. pressure and at 89° C. at 8 mm. pressure. This material was light chlorinated in the absence of added catalysts and fractionated to produce chloro-isopropyl-dichlorobenzene which on analysis was found to have a total chlorine content of 46.9% and a side-chain chlorine content of 12.6. It boiled at 257.6° C. at 760 mm. pressure and had a refractive index $N_D^{25}=1.5565$ and a density of 1.2975 g. per cc. at 25° C.

This chloro-isopropyl-dichloro benzene was then dehydrochlorinated at 280° C. in the presence of steam over a silica gel catalyst and on fractionation there was obtained an alpha-methyl-dichlorostyrene having a total chlorine content of 38.6%, an iodine value of 134.9, a density of 1.207 at 29° C. and a refractive index $N_D^{25}=1.5790$–$1.5793$. It boiled at 129–131° C. at 23 mm. pressure.

The resultant monomeric alpha-methyl-dichlorostyrene was polymerized by dissolving in methyl chloride and adding the solution to a methyl chloride solution of 0.005% of aluminum chloride (based on the monomer) at —70° C. The polymer thus formed was separated from the methyl chloride and was purified by dissolving in methyl-ethyl ketone and precipitating it from the solution by the addition of methanol. The product thus obtained was a fine white powder soluble in benzene, methyl-ethyl ketone, chloroform and trichloro-ethylene. It was found to have a softening point well over 220° C.

Example II

Homopolymers of alpha-methyl-trichloro-styrene were prepared from nuclear trichlorocumene by the following procedure: The nuclear trichlorocumene used as the starting material boiled at 134–136° C. at 18 mm., had a chlorine content of 46.15% and a refractive index ranging from $N_D^{25}=1.5545$ to $1.5530$. This material was light chlorinated without the addition of a catalyst to obtain alpha chloro isopropyl trichlorobenzene, boiling at 169–170° C. at 21 mm. and containing 52.8% total chlorine and 13.3% side-chain chlorine.

The chloro isopropyl trichlorobenzene was dehydrochlorinated at 300° C. in the presence of steam at atmospheric pressure over silica gel as a catalyst. The resultant material was fractionated to obtain monomeric alpha-methyl-trichlorostyrenes boiling at 152° C. at 20 mm., having a total chlorine content of 47.0% and a refractive index $N_D^{25}=1.5940$.

These monomers were polymerized by dissolving in methyl chloride containing anhydrous aluminum chloride and the homopolymers precipitated out from the solution as a powder by the addition of methanol.

Example III

Polymeric alpha-methyl-tetrachlorostyrene was prepared as follows:

A portion of the trichlorocumene used in the preceding example was nuclear chlorinated and fractionated to obtain nuclear tetrachlorocumene and pentachlorocumene. Some of the nuclear tetrachlorocumene thus obtained crystallized and was separated and was found to have a melting point of 33–35° C. Both the liquid and solid tetrachlorocumene fractions were light chlorinated and fractionated and an overhead fraction of chloro isopropyl tetrachlorobenzene was obtained boiling at 183° C. at 13 mm. and containing 59.9% chlorine, with a density of 1.5184 at 25° C. and a refractive index $N_D^{25}=1.5890$–$1.5905$. The residual material from a redistillation of the chloro-isopropyl tetrachlorobenzene was dissolved in methyl ethyl ketone and the solution poured into methanol. There was obtained, as a finely divided powdered precipitate, a polymeric alpha-methyl-tetrachlorostyrene containing 51.5% chlorine.

*Example IV*

A portion of chloro isopropyl tetrachlorobenzene, prepared as in intermediate product of Example III, containing 57.8% total chlorine, boiling at 183° C. at 13 mm. pressure and having a density of 1.5184 grams per cc. at 25° C. and a refractive index $N_D^{25}=1.5890$, was added to an aqueous solution of sodium hydroxide and the resultant mixture stirred for 18 hours at about 100° C. By this procedure there was obtained an impure alpha-methyl-tetrachlorostyrene boiling at 150–152°C. at 14 mm., having a total chlorine content of 53.2%, a side-chain chlorine content of 0.4%, an iodine value of 86.6 and a refractive index $N_D^{25}=1.5858$. Polymeric alpha - methyl tetrachlorostyrene was obtained from the residue on distillation of this impure material by solution and precipitation as in Example III.

*Example V*

Nuclear pentachlorocumene obtained by the fractionation in Example III was a white solid melting between 67 and 73° C. and boiling at 182–183° C. at 20 mm. pressure. This product upon light chlorination and fractionation yielded chloro isopropyl pentachlorobenzene, a white solid melting at 78.8° C. and boiling at 204° C. at 15 mm. The residue from this distillation was dissolved in acetone and the solution added to methanol, resulting in the precipitation of polymeric alpha-methyl-pentachlorostyrene as a powder containing 59.4% chlorine.

The polymeric product of each of the foregoing examples was a finely divided material, solid at temperatures of 220° C. and higher, and adapted to be molded under the influence of heat and pressure.

I claim:

A solid product obtained by polymerizing monomeric alphamethyl-dichlorostyrene, said alphamethyl-dichlorostyrene having been prepared by dehydrochlorination at 280° C. with steam and silica gel of light chlorinated isopropyldichlorobenzene having the constitution of monochloroisopropyldichlorobenzene.

JOHN J. HAYES.

REFERENCES CITED

The following references are of record in the file of this patent:

UNITED STATES PATENTS

| Number | Name | Date |
|---|---|---|
| 2,406,319 | Brooks et al. | Aug. 27, 1946 |
| 2,417,293 | D'Alelio | Mar. 11, 1947 |
| 2,439,213 | Kispersky et al. | Apr. 6, 1948 |
| 2,443,217 | Amos et al. | June 15, 1948 |
| 2,473,985 | Brooks | June 21, 1949 |
| 2,522,981 | Bachman et al. | Sept. 19, 1950 |

FOREIGN PATENTS

| Number | Country | Date |
|---|---|---|
| 564,829 | Great Britain | Oct. 16, 1944 |